(12) United States Patent
Blaschko et al.

(10) Patent No.: US 6,474,455 B1
(45) Date of Patent: Nov. 5, 2002

(54) CURRENT COLLECTOR

(75) Inventors: René Blaschko; Stefan Pahnke, both of Berlin (DE)

(73) Assignee: Daimlerchrysler Rail Systems GmbH (DE)

( * ) Notice: Subject to any disclaimer, the term of this patent is extended or adjusted under 35 U.S.C. 154(b) by 0 days.

(21) Appl. No.: 09/831,135

(22) PCT Filed: Oct. 21, 1999

(86) PCT No.: PCT/EP99/07996

§ 371 (c)(1),
(2), (4) Date: May 4, 2001

(87) PCT Pub. No.: WO00/29247

PCT Pub. Date: May 25, 2000

(30) Foreign Application Priority Data

Nov. 14, 1998 (DE) .......................... 198 52 639

(51) Int. Cl.$^7$ ................................. B60L 5/00
(52) U.S. Cl. ................. 191/45 R; 105/199.1
(58) Field of Search ............... 191/45 R, 50, 191/56, 59.1, 70; 104/117; 105/199.1, 199.2

(56) References Cited

U.S. PATENT DOCUMENTS 3,823,278 A * 7/1974 Gray ................... 191/45 R
4,363,940 A * 12/1982 Bertelsbeck ............... 191/59.1
5,497,866 A * 3/1996 Kobayashi et al. ........... 191/55
5,693,922 A * 12/1997 Tuohy et al. ............. 200/17 R
5,709,292 A * 1/1998 Breitbach et al. ............. 191/65
5,995,355 A * 11/1999 Daeumer .................... 361/120
6,273,001 B1 * 8/2001 Amigot et al. .............. 104/117

FOREIGN PATENT DOCUMENTS

| DE | 785100 A1 | * | 1/1997 |
| DE | WO-9738872 A1 | * | 4/1997 |
| EP | 0785100 | | 7/1997 |
| JP | 04172903 | | 6/1992 |
| WO | 9738872 | | 10/1997 |

* cited by examiner

*Primary Examiner*—S. Joseph Morano
*Assistant Examiner*—Frantz F. Jules
(74) *Attorney, Agent, or Firm*—Webb Ziesenheim Logsdon Orkin & Hanson, P.C.

(57) ABSTRACT

A current collector is located on a roof cover plate of a car body for a rail vehicle. Mounted on said current collector is an intermediate carrier for a current collector frame which is equipped with two wearing strips. Said intermediate carrier is suspended on oscillating rods. According to the invention, the intermediate carrier is configured in the form of a thin plate so that in its resting position, i.e. in its lowered position, the current collector, including wearing strips, is located within the regulation limitation line of the vehicle. In this way, the construction height is reduced.

9 Claims, 2 Drawing Sheets

CURRENT COLLECTOR

BACKGROUND OF THE INVENTION

1. Field of the Invention

The invention relates to a current collector according to the preamble of the first claim.

2. Description of the Prior Art

A known current collector of this type (EP 0 785 100 A1) is provided in the roof area of a rail vehicle whose car body can be inclined about the longitudinal axis. Provided on the roof of the car body, which serves as a base carrier for the current collector, are supports which are bent inwardly toward one another from the longitudinal sides, end at a distance from one another and are each provided in their end regions with two oscillating bearings whose axes run parallel to the longitudinal axis of the car body. In each case an oscillating element is pivotably mounted on the oscillating bearings and an intermediate carrier is pivotably secured to its downward-directed end in further oscillating bearings. The four oscillating bearings which are provided on the supports are each located here, like the four oscillating bearings assigned to the intermediate carrier, in one plane, the distance between two upper oscillating bearings arranged transversely with respect to the longitudinal direction of the car body being smaller than the distance between the associated, lower oscillating bearings. In each case four oscillating bearings arranged in a perpendicular plane are arranged at the end points of a trapezoidal four-bar mechanism. The intermediate carrier which is arranged in this way so that it can oscillate transversely to the longitudinal direction of the car body is embodied as a trapezoidal lattice frame which has a connecting strut which is transversal with respect to the longitudinal direction of the car body and at whose end points the lower oscillating bearings are arranged, while a connecting strut which is arranged above it and runs parallel thereto is located, when the car body and intermediate carrier are in the position of rest, at a short distance underneath the plane in which the upper oscillating bearings are located. On the upper transverse struts there are supporting insulators which hold, in an electrically insulated fashion, a base frame on which a current collector frame of a scissor-type current collector is secured in a vertically adjustable fashion. In order to keep the contact bar of the current collector frame at least largely independent of the inclination of the car body within a clearance profile predefined by a delimitation line, the base frame is pivoted counter to the inclination of the car body by an actuator which is controlled as a function of the inclination of the car body.

SUMMARY OF THE INVENTION

The invention is based on the object of implementing measures, in a current collector according to the preamble of the first claim, by means of which overall height is gained with a simple design.

This object is achieved in accordance with the invention by means of the characterizing features of the first claim.

In one embodiment of a current collector according to the invention, the embodiment of the intermediate carrier as an intrinsically rigid, thin plate provides a platform which is located in the region of the plane in which the lower oscillating bearings are located. The space located between the upper and lower oscillating bearings is thus free for the means required for the attachment of the current collector frame. Supporting insulators, to whose upwardly directed ends a base frame which bears the current collector frame can be fixed, can be fixed directly to the plate. If the plate is formed from an electrically insulating material, in particular formed from composite fiber materials so as to be intrinsically stiff, the base frame of the current collector frame can also be fixed directly to this plate, which ensures the electrical insulation with respect to adjacent components. Here too, the oscillating elements may be manufactured from an electrically insulating material in order to make the necessary electrical insulation distances and creepage current paths sufficiently large. In addition, the length of the oscillating elements may only be of such a magnitude that the distances from the roof of the car body which are required during operation are maintained and the upper oscillating bearings still lie within a delimitation line of the car body on the vehicle, which line is predefined according to the relevant regulations.

An independent carrier element may be used as the base carrier for the current collector and can be fixed to the roof of the associated car body. However, the base carrier is preferably embodied as part of the roof structure of the respective car body, on which base carrier four upwardly directed, in particular vertical supports are attached to the feet ends of the supports at the corner points of an imaginary rectangle. The upwardly pointing free ends of these supports are, on the other hand, provided with the upper oscillating bearings. In each case two supports are located here on a line running perpendicularly to the longitudinal axis of the car body, in front of the intermediate carrier, while the two other supports are arranged in a symmetrical arrangement with respect to the longitudinal axis of the car body behind the intermediate carrier in the direction of travel. As a result, the intermediate carrier can oscillate transversely with respect to the longitudinal direction of the car body between the pairs of supports and can be pivoted in each case counter to the inclination of the car body by means of an actuator device controlled as a function of the inclination of the car body. In order to ensure electrical safety at the current collector, it is expedient to provide, on the base frame of the current collector frame, an overvoltage diverter which is electrically connected between the base frame and the electrically conductive parts of the car body and ensures electrical protection of the car body region against overvoltages in the case of an inadmissible overvoltage at the current collector.

BRIEF DESCRIPTION OF THE DRAWINGS

The invention is explained in more detail below with reference to basic sketches of an exemplary embodiment, in which.

DESCRIPTION OF THE PREFERRED EMBODIMENTS

Figure 1:
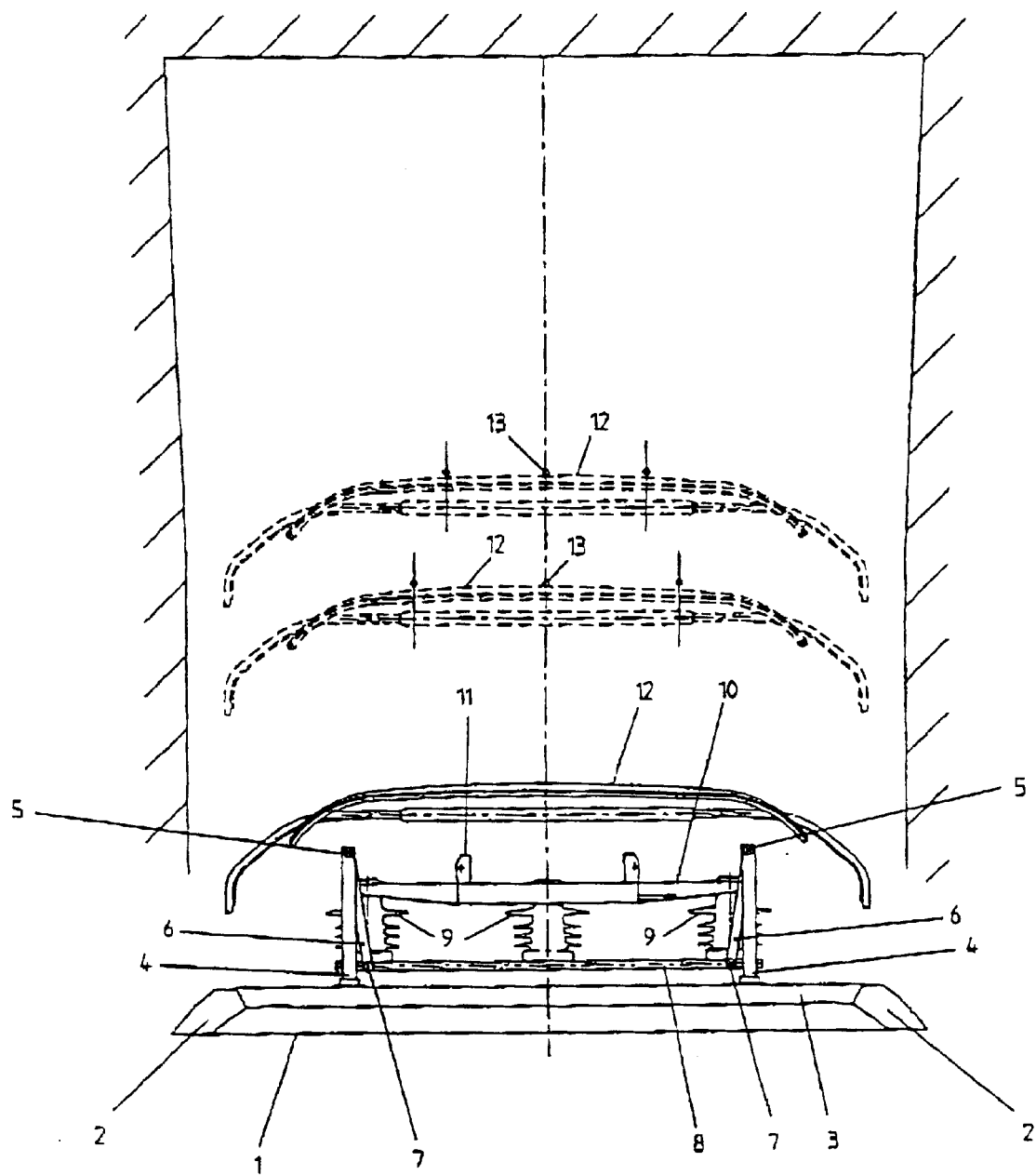
FIG. 1 shows a cross-sectional view through a non-inclined car body of a rail vehicle in the region of a current collector.

A car body 1 (illustrated only in cross section in the roof region) of a rail vehicle has a roof terminating plate 3 which is inserted between the roof carriers 2 and serves as a base carrier for a current collector which is mounted thereon and has two contact bars 12 which are mounted on a current collector frame (not illustrated). The current collector has at least two, but preferably four supports 4 which are located at the corner point of an imaginary rectangle and are arranged symmetrically with respect to the longitudinal axis of the car body, two of the supports 4 being located in any case on a line running transversely with respect to the longitudinal direction of the car body. The foot ends of the supports 4 which are of equal length and are preferably located on the roof terminating plate 3 in an upright position are rigidly fixed to the roof terminating plate 3, while the upper ends are fitted with oscillating bearings 5 whose axes run parallel to the longitudinal direction of the car body. Mounted at one end on the upper oscillating bearings 5 are oscillating rods 6 which are directed downward and whose lower ends are also equipped with oscillating bearings 7. The oscillating bearings 7 connect the oscillating rods 6 in an articulated fashion to an intermediate carrier 8 which is located parallel to the roof terminating plate 3 in the non-inclined position of the car body 1, according to FIG. 1. The horizontal distance between associated oscillating bearings 5 provided on a line transversely with respect to the longitudinal axis of the car body is greater than the distance between the two associated lower oscillating bearings 7. When the intermediate carrier 8 is adjusted with respect to one of the longitudinal sides of the car body or with respect to a longitudinal roof carrier 2, the intermediate carrier 8 is thus lowered downward on the side to which the movement is directed, while the opposite end is raised in an upward direction. When the car body 1 is inclined in such a way that the roof rocks to the right in accordance with FIG. 2, the intermediate carrier is moved to the left by an appropriately controlled actuator.

Figure 2:
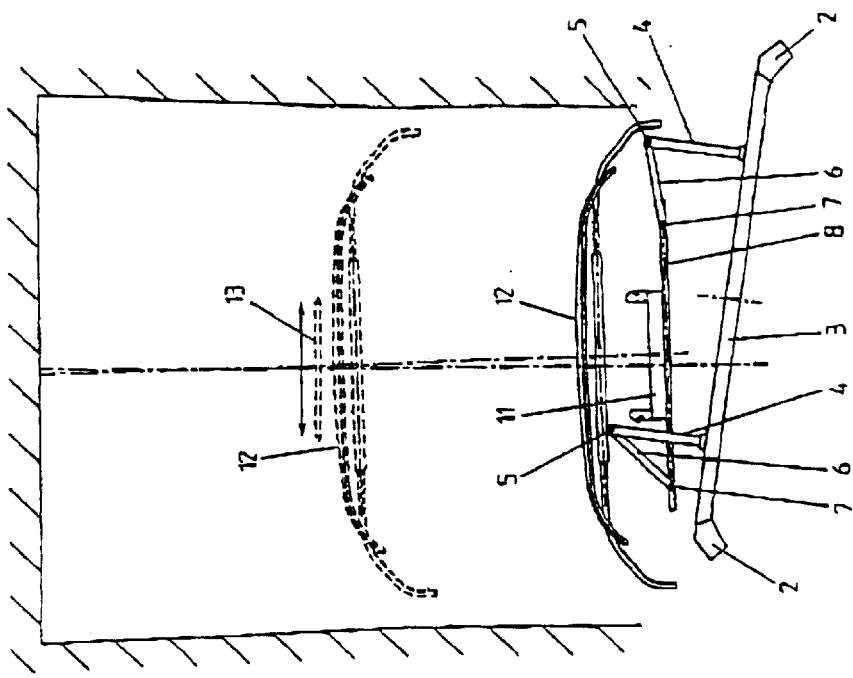
FIG. 2 shows the arrangement according to FIG. 1 with the car body inclined.

According to FIG. 2, supporting insulators 9 are permanently mounted on the intermediate carrier 8 and at their upwardly directed free ends a base frame 10 is attached using securing elements 11. A current collector frame (not illustrated) of a scissor-type current collector is pivotably coupled to the securing elements 11, the current collector frame being fitted with two contact bars 12. The contact bars can be adjusted vertically with respect to the intermediate carrier 8 by means of the current collector frame, with the result that in the operating state the contact bars 12 remain in each case in a position of reliable contact with a current collector overhead line indicated by 13. This is ensured over the entire operating travel of the current collector by a suitable configuration of the oscillation geometry.

Figure 3:
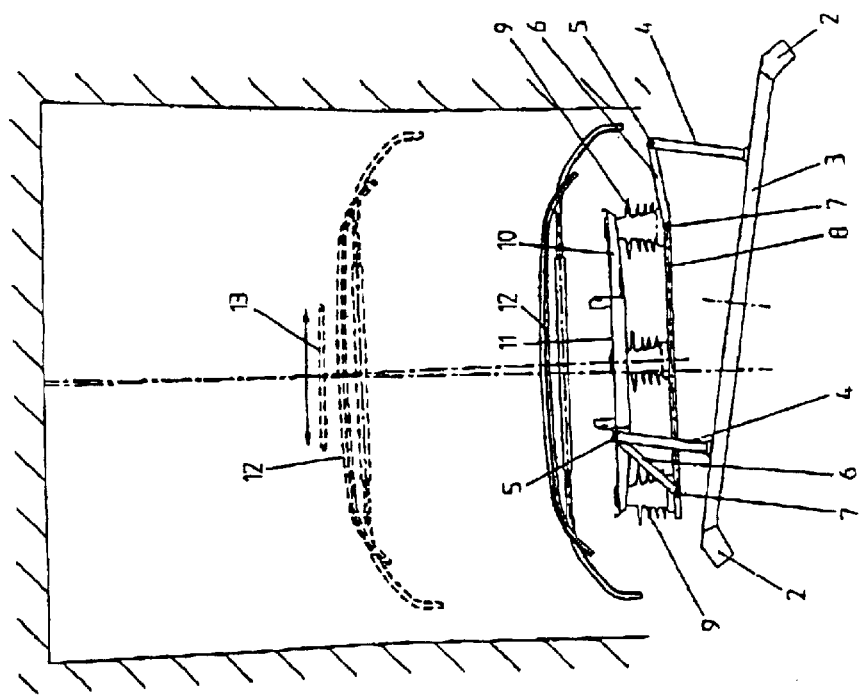
FIG. 3 shows a further basic cross sectional view of an inclined car body in the region of a current collector which is mounted without supporting insulators.

In the embodiment according to FIG. 3, the securing element 11 for the current collector frame without supporting insulators is fixed directly to the intermediate carrier 8. In order to achieve the necessary electrical insulation here, the intermediate carrier 8 is manufactured from an electrically insulating material.

The intermediate carrier 8 is generally of a thickness which is at most one quarter (¼), preferably however only approximately one-tenth (1/10) of the vertical distance between the upper and lower oscillating bearings 5, 7. The overall height is thus reduced to a minimum. In addition, it may also be expedient to fabricate the oscillating rods 6 from insulating material, which may, if appropriate, also apply to the oscillating rods 4. It is also possible to fabricate at least that region of the roof terminating plate 3 from an insulating material which is located in the region of the current collector if extremely low overall heights are aimed at.

The configuration of the four-bar mechanism with the oscillatory joints 5, 7 and the associated supports 4, oscillating rods 6 and the intermediate carrier 8 is selected such that when the car body 1 is inclined the contact bars 12 do not experience any relevant lateral displacement with respect to the current collector overhead line. The intermediate carrier 8 is accordingly controlled by the oscillating rods 6 in such a way that it always remains in a horizontal position and at the same time adjusts the holder 11 through a path transversely with respect to the longitudinal direction of the car body, by means of which the transverse movement of the base carrier and of the roof terminating plate 3 is compensated when the car body is inclined. As a result, the contact bars 12 do not leave the region in which the current collector overhead line 13 is located owing to its operationally required zigzag position.

The supports 4 may have not only a rod shape but also, for example, a triangular shape in order to increase the connecting area for the transmission of force to the base carrier 3.

What is claimed is:

1. A current collector for a rail vehicle having an inclinable car body, the current collector comprising:

a base carrier;

an intermediate carrier pivotably secured to the base carrier by four symmetrically arranged oscillating rods of equal length;

four upper oscillating bearings are provided on the base carrier;

four associated lower oscillating bearings are provided on the intermediate carrier, wherein the four upper oscillating bearings are arranged in a plane above the four associated lower oscillating bearings and wherein the distance between every two upper oscillating bearings being different from the distance between the associated lower oscillating bearings; and a current collector frame directly fixed to the intermediate carrier, wherein the intermediate carrier is a plate to which the associated lower oscillating bearings are fixed.

2. The current collector according to claim 1, wherein on the base carrier there are four oscillating supports whose upwardly directed end is provided in each case with an upper oscillating bearing assigned to the base carrier.

3. The current collector according to claim 1, wherein the upper oscillating bearings are arranged with a predefined vehicle delimitation line on a car body.

4. The current collector according to claim 1, wherein the plate is intrinsically rigid and is composed of an electrically insulating material.

5. The current collector according to claim 4, wherein the current collector frame is secured directly to the plate by a base frame.

6. The current collector according to claim 1, wherein the oscillating rods are composed of an electrically insulating material.

7. The current collector according to claim 1, wherein an overvoltage inverter is arranged on the base frame and is electrically connected between the base frame and the electrically conductive parts of the car body.

8. The current collector according to claim 1, wherein the distance between associated upper oscillating bearings is greater than the distance between associated lower oscillating bearings.

9. A current collector for a rail vehicle having an inclinable car body comprising:

a base carrier having at least four attached supports;

an intermediate carrier, wherein the intermediate carrier is a plate;

a current collector frame directly fixed to the plate; and four symmetrically arranged oscillating rods of equal length used to pivotably secure the plate to the supports of the base carrier, wherein each oscillating rod has an upper oscillating bearing attached to one end of the oscillating rod and an associated lower oscillating bearing attached to an opposite end of the oscillating rod.

* * * * *